United States Patent [19]
Lupien, Jr. et al.

[11] Patent Number: 5,959,530
[45] Date of Patent: Sep. 28, 1999

[54] REMOTE COMPUTER SECURITY SYSTEM FOR COMPUTERS, PRINTERS AND MULTIFUNCTION DEVICES

[75] Inventors: Gordon F. Lupien, Jr., Ontario; Craig A. Smith, Pittsford, both of N.Y.

[73] Assignee: Xerox Corporation, Stamford, Conn.

[21] Appl. No.: 09/124,371

[22] Filed: Jul. 29, 1998

[51] Int. Cl.⁶ .................................................. G08B 13/14
[52] U.S. Cl. .............................. 340/568.1; 340/825.31; 340/825.54; 399/80
[58] Field of Search ................................. 340/568.1, 571, 340/505, 825.54, 686.6, 573.4, 825.31, 825.32, 825.34; 235/382, 382.5; 399/80, 79, 81; 341/176

[56] References Cited

U.S. PATENT DOCUMENTS

| | | |
|---|---|---|
| 3,378,831 | 4/1968 | Metcalf .......................... 340/825.31 X |
| 3,891,980 | 6/1975 | Lewis et al. .......................... 340/573.4 |
| 4,224,613 | 9/1980 | Kaiser et al. ............................. 340/679 |
| 4,531,826 | 7/1985 | Stoughton et al. ....................... 399/80 |
| 5,305,055 | 4/1994 | Ebner et al. ................................. 399/9 |
| 5,552,858 | 9/1996 | Ujiie et al. ................................ 399/80 |
| 5,629,981 | 5/1997 | Nerlikar ......................... 340/825.34 X |

*Primary Examiner*—Thomas Mullen
*Attorney, Agent, or Firm*—Ronald F. Chapuran

[57] ABSTRACT

A method of preventing theft or unauthorized use of a computer including a radio frequency identification (RFID) tag allowing use of the machine only within range of the tag and when the tag is recognized. Moving or accessing the computer without the tag in range activates a security system. The computer provides a continuous authorization signal and monitors for a received signal indication of a valid response from the RFID tag. Access is denied unless a valid response is received to the authorization signal. Upon receipt of a valid response, the computer is enabled, in particular enabled to create images on paper, on screens, or to be stored in memory.

11 Claims, 3 Drawing Sheets

REMOTE COMPUTER SECURITY SYSTEM FOR COMPUTERS, PRINTERS AND MULTIFUNCTION DEVICES

FIELD OF THE PRESENT INVENTION

The present invention is directed to computer security systems, and more specifically, to an electronic device that prevents theft or unauthorized use of a computer and/or printer (or other document processing or imaging device) as well as promoting efficient use of these systems.

BACKGROUND OF THE PRESENT INVENTION

Computer theft is on the rise. Presently there is no adequate deterrent to the theft of or access to electronic devices or systems. Passwords are currently used to prevent unwanted access to the equipment, but information on how to clear passwords is available without security checks. Thieves can easily erase the password and use the machine as if they were the owner. Furthermore, passwords do little to actually prevent the item from being stolen at the time and place of the potential theft, when prevention would be the most effective. It would be desirable to provide a method of securing an easily stolen electronic device by using (RFID) Radio Frequency Identification. While preventing unauthorized use or theft, RFID allows the owner to disarm the security system and use the equipment by bringing a pocket item containing an RFID tag within range of the device. The proper RFID tag would disarm the security system that would otherwise activate a visual or audible warning to deter potential thieves and/or render the device useless.

A related need is as follows. Energy saving devices are common in today's office. One such device is the screen saver and auto powerdown programs on computers. The computer displays a screen saver after a certain time of inactivity no matter whether the user wants to use it or not. The proposed device would wait some specified time and then check whether the user is nearby. It would turn off the screen only if the user wasn't present. The ultimate system would also check at intervals to notice if the user had returned so the system or monitor could turn back on. Integrated with a time function, the rules would be programmable to power down the whole computer if the user wasn't present after a certain time and then come on again in the morning when the user returned. Any tampering while the owner was not present at night would result in a more severe reaction than in the daytime.

Another version would allow secure printing of documents only when the originator was near the printer. In the print driver that is displayed when the document is submitted for printing, the user would specify secure delivery. The printer would hold the job in memory and begin "listening" for an RFID response from the matching user. When the user arrived near the printer, the transponder would cause the printer to output (release) their prints when they arrived. If more than one user is present, a confirmation would or could be required. The same information about the presence of one or more authorized users would cause the printer to enter or exit a power saver mode.

Notification and alarm systems are well known in the prior art. For example, U.S. Pat. No. ,305,055, assigned to the same assignee as the present invention, discloses a system of notification to selected remote stations in response to the detection of predetermined machine conditions. Also, U.S. Pat. No. 4,224,613 discloses a warning system that provides an acoustic warning whenever predetermined machine running conditions are exceeded.

It would be desirable, however, to provide a computer theft and unauthorized usage deterrent that is effective, relatively simple to implement, and related to normal operator activity/presence, rather than implied time factors or a special disarming signal by the user.

It is an object of the present invention, therefore, to provide a portable electronic device that can be used to control a wide variety of deterrent functions. It is another object of the present invention to provide a small RFID tag that allows the use of a particular machine (or group of machines) when one or more authorized users are within a specified range of the machine. It is still another object of the present invention to provide appropriate warnings, alarms, or system shutdowns whenever a device is moved or accessed without a suitable RFID tag within machine range. Further advantages of the present invention will become apparent as the following description proceeds, and the features characterizing the invention will be pointed out with particularity in the claims annexed to and forming a part of this specification.

SUMMARY OF THE PRESENT INVENTION

The present invention is a method of preventing theft or unauthorized use of a computer or printer (or multifunction device) including a radio frequency identification (RFID) tag allowing use of the machine only when an authorized user is within range of the machine and when the user's tag is recognized. Moving or accessing the computer without the tag in range activates a security system. The computer provides a continuous, frequent or timed authorization signal and monitors for a received (returned) signal indication of a valid response from the RFID tag. Access is denied unless a valid response is received to the authorization signal. Upon receipt of a valid response, the computer or other controlled component is enabled, in particular enabled to perform computer or control functions to create or scan images on paper, on screens, or to be stored in memory with other controlled functions.

BRIEF DESCRIPTION OF THE DRAWINGS

The following is a brief description of the drawings used to describe the present invention, and thus, these drawings are being presented for illustrative purposes only and thus should not be limitative of the scope of the present invention, wherein.

DETAILED DESCRIPTION OF THE PRESENT INVENTION

Figure 1:
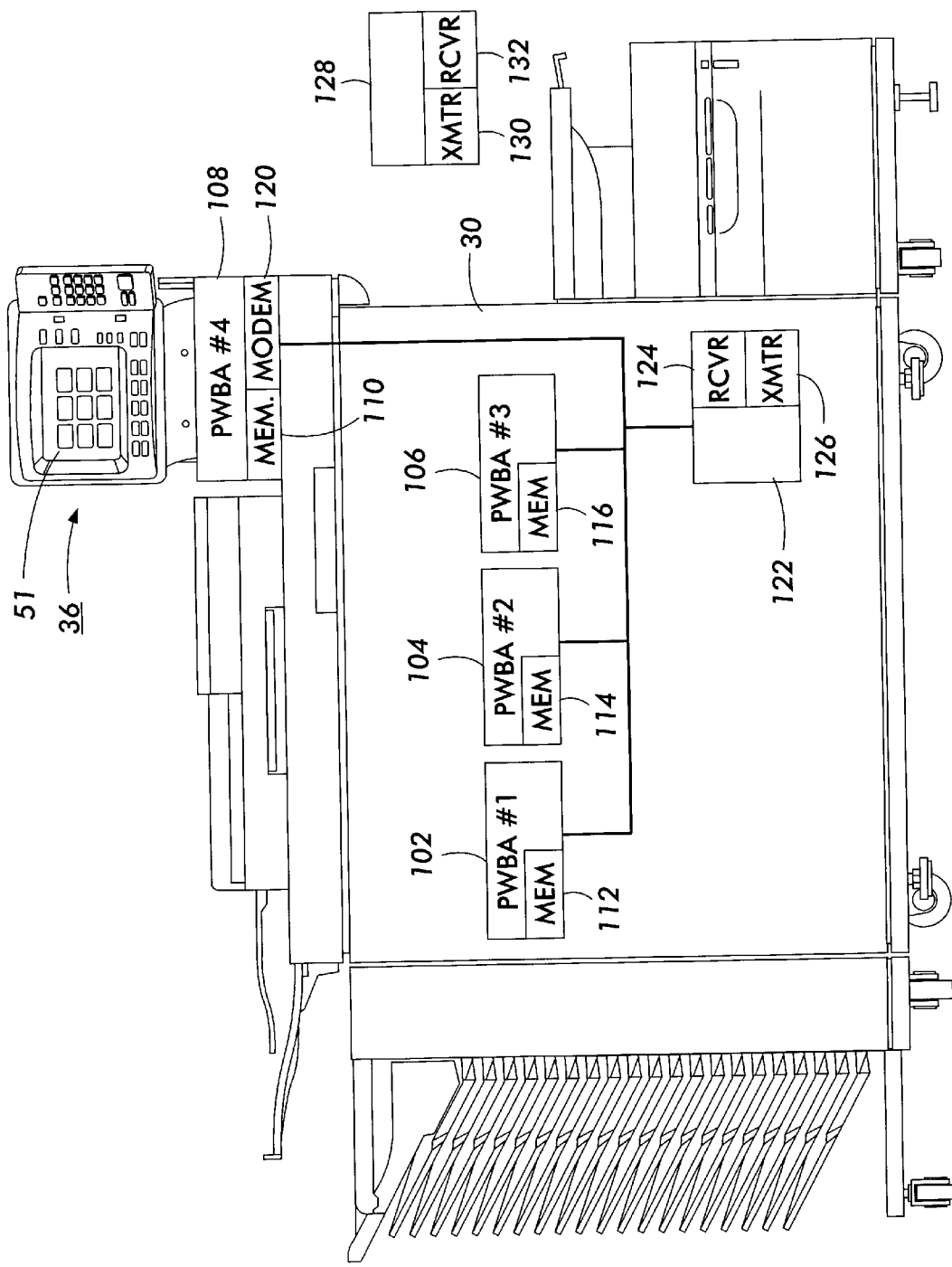
FIG. 1 is a plan view illustrating a typical printing system incorporating the present invention.
Figure 3:
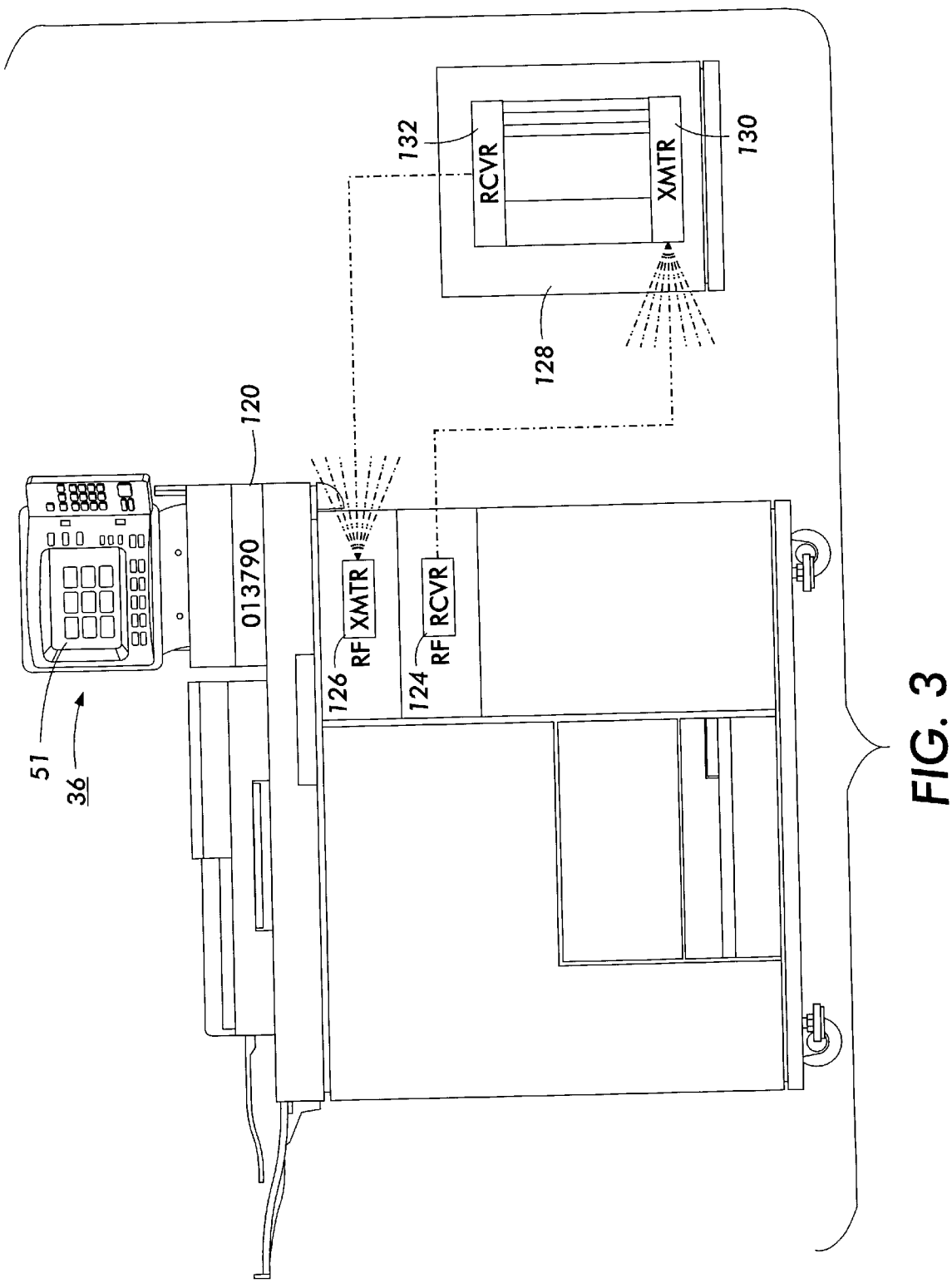

With reference to FIGS. 1 and 3, there is illustrated in general block form, the control of a typical copier or printer machine. The machine is controlled by a plurality of printed wiring boards interconnected to a common channel or bus 98. For purposes of explanation, four printed wiring boards, boards; 102 with memory 112, 104 with memory 114, 106 with memory 116, and 108 with memory 110 are illustrated, with printed wiring board 108 being the control for the user interface 36 and the remaining printed wiring boards providing control for predetermined systems and components of the machine. The various components include an image scanner or memory for storing an image, an image projecting device, a copy sheet feeding device, and various devices to transfer an image to a copy sheet. Printed wiring board, 108 is also provided with modem 120 for communication with a remote location.

It should be understood that the number of printed wiring boards and the manner of interconnection is merely a design choice and any other suitable control scheme for controlling the base machine is contemplated within the scope of this invention. It should also be noted that one of the printed wiring boards, for example, board 102 could be the master control for the other printed wiring boards or that there can be any number of master slave relationships of the control boards or distributed control of the various functions of the machine. A user interface 36 that is controlled by software is also part of the common network, illustrated by printed circuit board 108 and a modem 120 is provided for remote communication.

The printed circuit board 108 controlling the user interface 36 is able to monitor all communications on the network 98 and display the communications on the screen 51. Each of the memories 112, 114, 116, and 110 suitably store key status, event, and fault data related to the machine for access by a service representative, and display on screen 51, or for remote transmission via modem 120. In accordance with the present invention, part of the control includes an interrogator or reader 122 with radio frequency receiver 124 and transmitter 126 for communicating with a remote tag 128 with transmitter 130 and receiver 132.

As illustrated in FIGS. 1 and 3, a portable electronic system that is theft deterrent can be used to control a wide variety of deterrent functions. The owner of the device need only carry a small RFID tag 128 on their person, possibly in the form of a keychain, wallet, or other personal article normally carried at all times. This tag 128 allows the owner to use the machine when it is within the specified active range of the tag. If the machine is moved or accessed without the tag being in range, the security system is activated, resulting in a verbal warning, siren, system shutdown, or any other appropriately designed deterrent.

This technology could be added to portable, desktop, or stationary equipment to disarm a motion sensing and/or power sensing security system which could alert others of a possible theft with a shrill alarm, warn the potential thief that the security system was installed, render the portable device inoperable, or even destroy the device unless the RFID tag was near, or even wipe the storage media clean of data (as an information security measure). The RFID security systems are excellent theft deterrents because they render the stolen goods useless to anyone without the correct RFID tag. More importantly, it is possible to make the potential thief strongly aware of the consequences at the time of the attempted theft by giving an immediate audible or visible notice depending on the capabilities of the device being protected.

In the best case, the portable device cannot be made to operate without the tag in range under any circumstances. Any of a series of increasingly severe responses can be implemented. This device can be integral to the portable device for high security or added as an option (with a possible loss of some security). It is small, uses very little power, and has no effect on the normal operation of the portable device. Depending on how it is installed and integrated into the portable device it is protecting, the theft deterrent can provide a complete lock out and even the destruction of the electronic device it is protecting. In any but the destructive case, the machine will be operable again as soon as the owner (and tag) comes within range. Any deterrent that can be electrically activated can be used with the tag proposal. The best deterrent is the fact that the system can activate a verbal statement, siren or other signal that tells the potential thief that the device is protected so they don't steal it in the first place.

An RFID system consists of an RF transmitter/receiver, reader 122 (in the protected device) and a passive transponder, tag 128 (on the person of the owner) that receives the transmitter's frequency. The receiver does not use any kind of a replaceable on-board power source because it stores power generated from rectifying RF energy. When the transponder receives the transmitter's frequency, it transmits a programmed sequence of signals (as a unique ID) which are then detected by the receiver in the protected device. The RF transmitter portion in the protected device sends out a signal whenever it is moved or turned on to check for the presence of the transponder tag. The absence of a response from the owner's transceiver indicates an attempt to use or steal the device by someone other than the owner.

Figure 2:
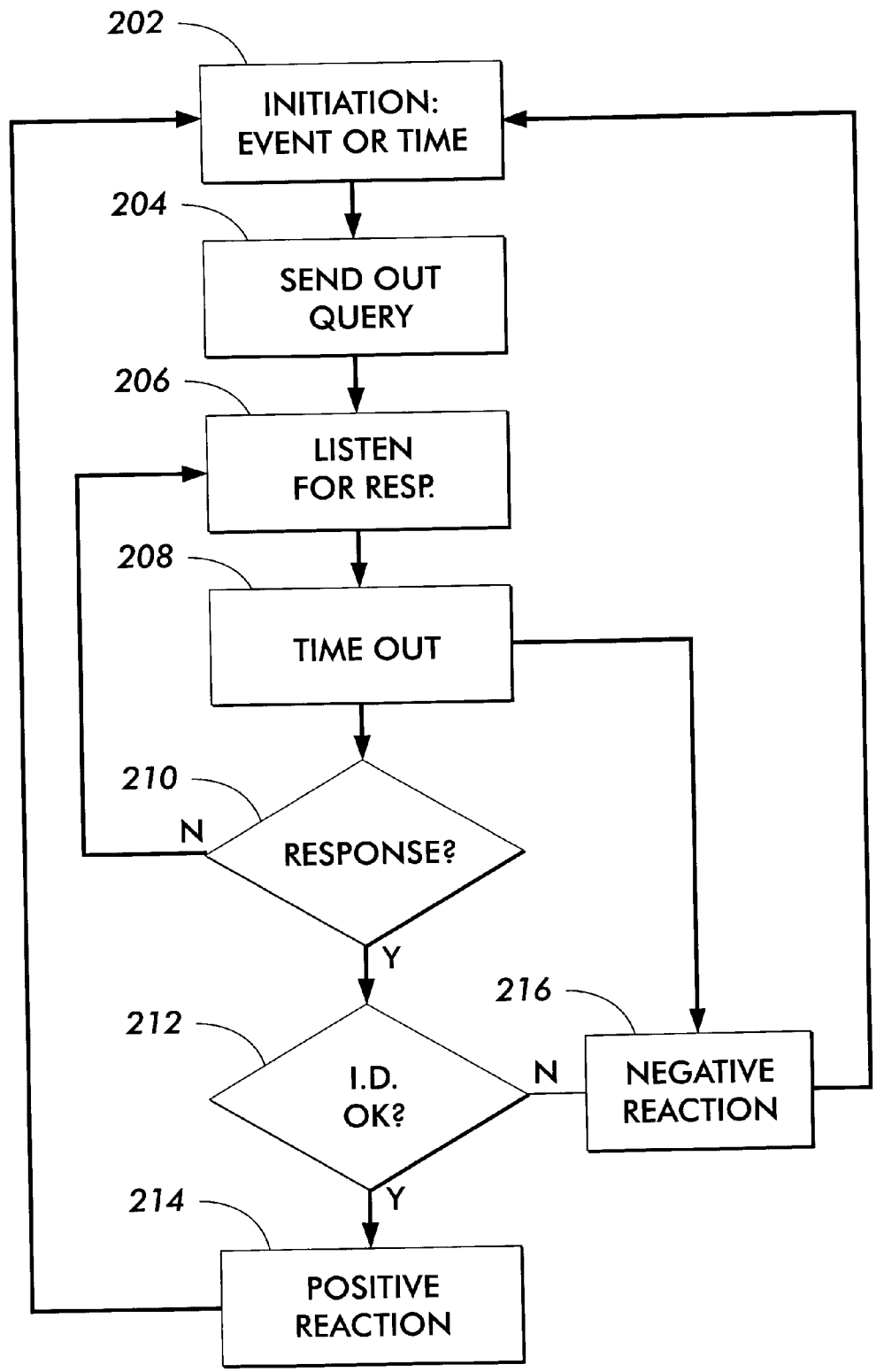
FIG. 2 is a flowchart illustrating a method of security and access control in accordance with the present invention, and FIG. 3 further illustrate a technique of security and access control in accordance with the present invention.

With reference to FIG. 2, there is shown a flow chart representative of one embodiment of the present invention. In particular, block 202 illustrates the initiation of the security or limited access technique. The procedure can be initiated by the occurrence of an incident or event or set to be initiated at given periods of time as examples. Upon initiation, the device or machine being secured sends out a radio frequency query 204 and then waits for an appropriate response as shown in block 206. Block 208 represents a suitable time out after which it is assumed that there will be no receipt of a valid response, triggering a negative reaction as illustrated at block 216. As illustrated at block 210, if no response is received, the procedure continues to listen for responses illustrated at block 206. If a response is received, then as illustrated at decision block 212, there is a determination as to whether or not there is a valid identification provided in the response. If not, then there is a negative reaction again as illustrated at block 216. It should be understood that the system can be enabled to respond to multiple tags or multiple users and create an access or authorized use for a group, team, department, or any desired set of users.

The negative reaction can depend upon planned or programmed factors and events and could be such things as the sound of an alarm, the turn off of a machine, or even putting a machine in a power saving mode. It should be understood that the scope of the invention encompasses various negative reactions if the appropriate ID signal is not received that can be programmed or set into the system to provide various warning signals, denying access signals, or any other suitable response. If, as illustrated in decision block 212 there is a valid identification signal received, then as illustrated at block 214 there is a positive reaction. Positive reactions, within the scope of the present invention, can be any number of reactions suitable for the specific machine and the machine environment. Such reactions can be to turn the machine on, allow access to the machine, possibly even allowing only access for specific operations of the machine. Whether a positive reaction or a negative reaction has been taken, the system will then revert as illustrated at block 202 to the monitoring of an event or a time lapse to again initiate the sending of a query.

While the present invention has been described with reference to various embodiments as described above, it is not confined to the details set forth above, but is intended to cover such modifications or changes as may come within the scope to the attached claims.

What is claimed is:

1. In an image processing apparatus for producing images on a medium, a method of preventing unauthorized use of the apparatus comprising the steps of:

providing a continuous authorization signal from the image processing apparatus, the authorization signal being a periodic timed signal, monitoring a receiver within the image processing apparatus for a received signal indication of a valid response to the authorization signal, denying access to the image processing apparatus with lack of sensing a received signal indication of a valid response to the authorization signal, and providing access to the image processing apparatus and enabling the apparatus to create images upon sensing a received signal indication of a valid response to the authorization signal.

2. The method of claim 1 wherein the step of providing access to the image processing apparatus and enabling the apparatus to create images includes the step of providing access to a service technician.

3. The method of claim 1 wherein the step of providing access to the image processing apparatus and enabling the apparatus to create images includes the step of enabling the creation of images on paper and images on a display screen.

4. The method of claim 1 wherein the step of denying access to the image processing apparatus with lack of sensing a received signal indication of a valid response to the authorization signal includes the step of turning the apparatus off.

5. The method of claim 1 wherein the step of denying access to the image processing apparatus with lack of sensing a received signal indication of a valid response to the authorization signal includes the step of providing an alarm signal.

6. The method of claim 1 wherein the step of denying access to the image processing apparatus with lack of sensing a received signal indication of a valid response to the authorization signal includes the step of initiating a power saver mode.

7. The method of claim 1 wherein the step of providing a continuous authorization signal from the image processing apparatus includes the step of providing a continuous signal in response to an event.

8. The method of claim 7 wherein the event is the physical motion of the apparatus.

9. In an image processing apparatus for producing images on a medium, a method of preventing unauthorized use of the apparatus comprising the steps of:

providing a radio frequency authorization signal from the image processing apparatus, the authorization signal including a continuous signal in response to an event, monitoring a receiver within the image processing apparatus for a received signal indication of a valid response to the authorization signal, and providing an alarm signal in the absence of sensing a received signal indication of a valid response to the authorization signal.

10. The method of claim 9 wherein the step of providing a radio frequency authorization signal from the image processing apparatus includes the step of providing a periodic timed signal.

11. The method of claim 9 wherein the event is the physical motion of the apparatus.

* * * * *